United States Patent
Nishida et al.

(10) Patent No.: US 8,941,953 B2
(45) Date of Patent: Jan. 27, 2015

(54) DISK DRIVE SUSPENSION AND MANUFACTURING METHOD THEREFOR

(71) Applicant: NHK Spring Co., Ltd., Yokohama-shi, Kanagawa (JP)

(72) Inventors: Tatsuhiko Nishida, Yokohama (JP); Isamu Kuchiwaki, Yokohama (JP)

(73) Assignee: NHK Spring Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 14/469,061

(22) Filed: Aug. 26, 2014

(65) Prior Publication Data

US 2014/0368955 A1  Dec. 18, 2014

Related U.S. Application Data

(62) Division of application No. 13/858,641, filed on Apr. 8, 2013, now Pat. No. 8,854,770.

(30) Foreign Application Priority Data

May 9, 2012  (JP) .................................. 2012-107607

(51) Int. Cl.
 *G11B 5/56* (2006.01)
(52) U.S. Cl.
 USPC ...................................................... 360/244.7
(58) Field of Classification Search
 USPC ...................................................... 360/244.7
 See application file for complete search history.

(56) References Cited

U.S. PATENT DOCUMENTS

| 6,597,541 | B2 |   | 7/2003 | Nishida et al. |   |
|---|---|---|---|---|---|
| 6,731,472 | B2 |   | 5/2004 | Okamoto et al. |   |
| 8,248,735 | B2 | * | 8/2012 | Fujimoto et al. | 360/294.4 |
| 8,254,065 | B2 | * | 8/2012 | Inoue et al. | 360/294.4 |
| 8,335,055 | B2 | * | 12/2012 | Hanya et al. | 360/294.4 |
| 8,390,961 | B2 | * | 3/2013 | Fujimoto et al. | 360/294.4 |
| 8,432,642 | B2 | * | 4/2013 | Fujimoto et al. | 360/265.9 |
| 8,559,137 | B2 | * | 10/2013 | Imuta | 360/294.4 |

FOREIGN PATENT DOCUMENTS

| JP | 2001-307442 A | 11/2001 |
|---|---|---|
| JP | 2002-50140 A | 2/2002 |
| JP | 2002-184140 A | 6/2002 |

* cited by examiner

*Primary Examiner* — Mark Blouin
(74) *Attorney, Agent, or Firm* — Holtz, Holtz, Goodman & Chick PC

(57) ABSTRACT

An actuator mounting section includes a plate member including a first plate and a second plate. The first plate is formed with an opening which accommodates an actuator element. The second plate includes a main body portion which overlaps the first plate and supporting portions which support opposite ends of the actuator element. A narrow portion narrower than the first plate is formed at a part of the main body portion of the second plate. A weld seal portion is formed by laser-welding the first plate and the second plate at the narrow portion. Adhesive is provided between the opposite ends of the actuator element and an inner surface of the opening of the first plate.

5 Claims, 9 Drawing Sheets

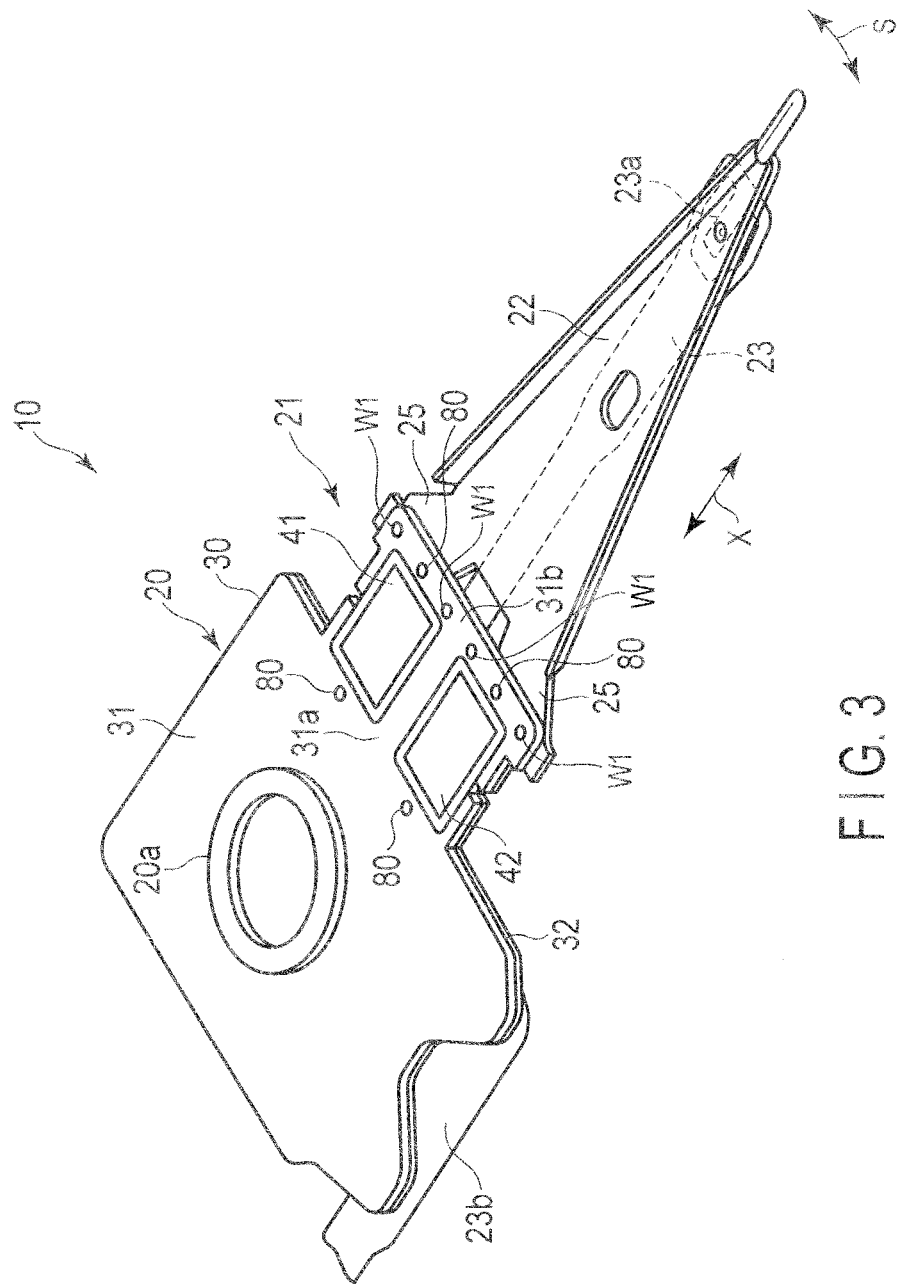
F I G. 3

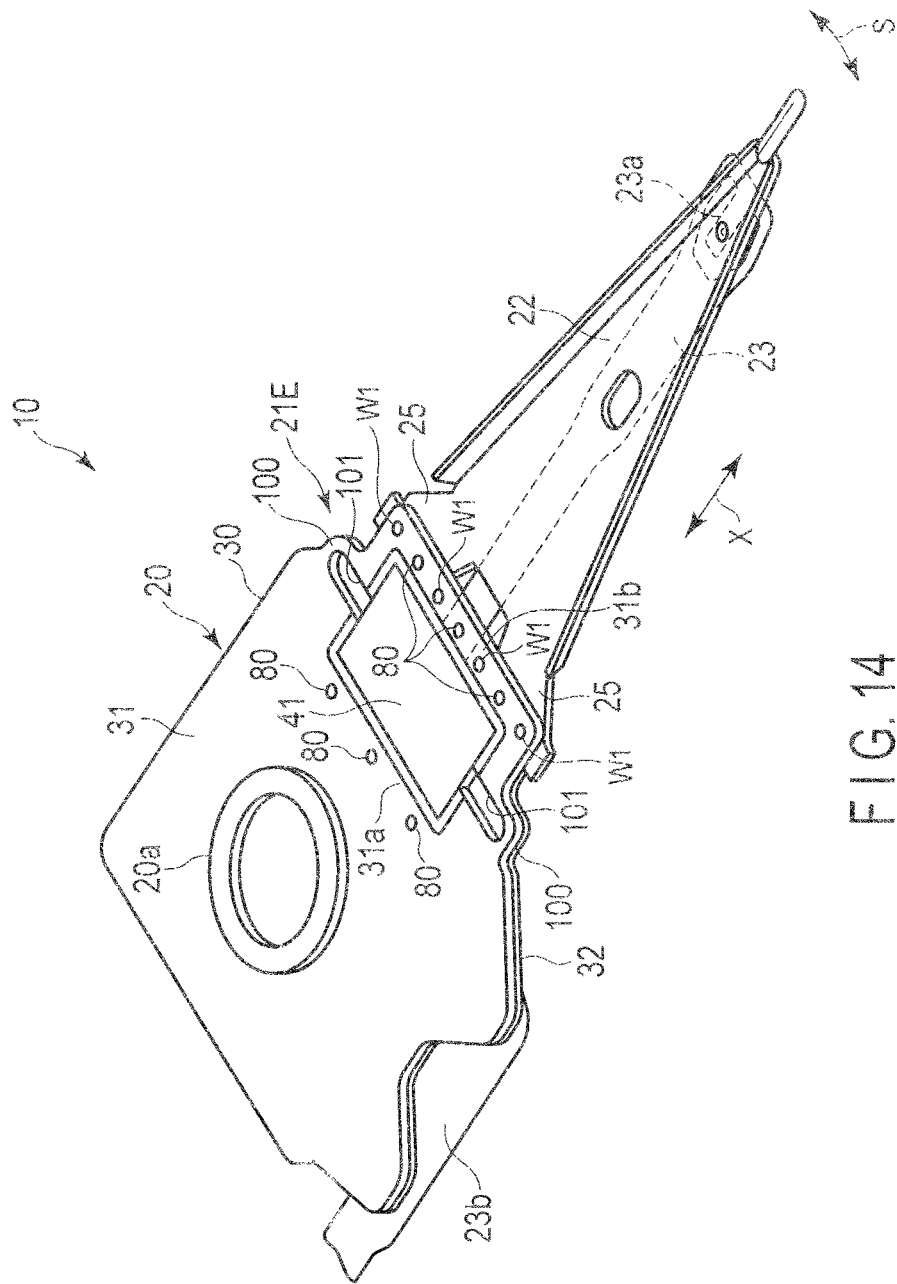
F I G. 14

DISK DRIVE SUSPENSION AND MANUFACTURING METHOD THEREFOR

CROSS-REFERENCE TO RELATED APPLICATIONS

This is a Divisional of U.S. application Ser. No. 13/858,641, filed Apr. 8, 2013, which is based upon and claims the benefit of priority from prior Japanese Patent App. No. 2012-107607, filed May 9, 2012, the entire contents of both of which are incorporated herein by reference.

BACKGROUND OF THE INVENTION

1. Field of the Invention

This invention relates to a disk drive suspension, comprising an actuator element of, for example, lead zirconate titanate (PZT), and a manufacturing method therefor.

2. Description of the Related Art

A hard disk drive (HDD) is used in an information processing apparatus, such as a personal computer. The HDD comprises a magnetic disk rotatable about a spindle, a carriage turnable about a pivot, etc. The carriage, which comprises an actuator arm, is configured to be turned transversely relative to tracks about the pivot by a positioning motor, such as a voice coil motor.

A suspension is mounted on the actuator arm. The suspension comprises a load beam and flexure superposed thereon. A slider, which constitutes a magnetic head, is mounted on a gimbal portion formed near the distal end of the flexure. The slider is provided with elements (transducers) for accessing data, that is, for reading or writing data.

In order to overcome the increase in the recording density of disks, the magnetic head should be more precisely positioned relative to the recording surface of each disk. To attain this, as disclosed in Jpn. Pat. Appln. KOKAI Publications Nos. 2001-307442 (Patent Document 1) and 2002-50140 (Patent Document 2), for example, dual-stage actuator (DSA) suspensions have been developed that combine a positioning motor (voice coil motor) and actuator element made of a piezoelectric material, such as lead zirconate titanate (PZT).

The distal end of the suspension can be moved by an infinitesimal distance in a sway direction (or transversely relative to tracks) by applying a voltage to and thereby deforming the actuator element. This actuator element is disposed on an actuator mounting section at a part of the suspension.

An opening is formed in a plate member constituting a part of the actuator mounting section, and the actuator element is accommodated in the opening. As disclosed in Jpn. Pat. Appln. KOKAI Publication No. 2002-184140 (Patent Document 3), for example, the plate member with the opening comprises a stationary part and movable part. One end of the actuator element is secured to the stationary part of the plate member with adhesive, and the other end to the movable part with adhesive.

An example of the plate member comprises a first plate and second plate. These first and second plates are superposed thicknesswise and secured to each other by laser welding. The adhesive is applied in an uncured state to the inner surface of the opening of the plate member. The adhesive is cured after the actuator element is disposed in the opening. In the case of the plate member comprising the first and second plates, however, the adhesive may sometimes infiltrate into a mating surface between the first and second plates by capillary action. The adhesive interposed between the first and second plates may possibly influence the rigidity of the actuator mounting section, thereby adversely affecting the characteristics of the actuator mounting section.

BRIEF SUMMARY OF THE INVENTION

Accordingly, the object of this invention is to provide a disk drive suspension with actuator elements of PZT or the like, in which adhesive for securing the actuator elements can be kept from influencing the rigidity of an actuator mounting section, and a manufacturing method therefor.

One embodiment of a disk drive suspension comprises a plate member comprising a first plate and a second plate. The first plate comprises an opening which accommodates the actuator element, a stationary part to which one end of the actuator element is secured, and a movable part to which the other end of the actuator element is secured. The second plate comprises a main body portion, which overlaps the first plate thicknesswise, and supporting portions, which support the opposite ends of the actuator element, and is formed with a narrow portion narrower than the first plate, on a part of the main body portion. A weld seal portion formed by welding the first plate and the second plate together is provided on the narrow portion. Adhesive is provided between the opposite ends of the actuator element and an inner surface of the opening.

According to this arrangement, the adhesive for securing the actuator element can be kept from infiltrating between the first and second plates, so that the rigidity of an actuator mounting section can be prevented from being influenced by the adhesive.

In the one embodiment, the narrow portion may be formed in a region near the supporting portion and narrower than the width of the supporting portion. In this embodiment, a plurality of narrow portions may be arranged spaced apart from one another, transversely relative to the supporting portion, and the weld seal portion may be provided on each of the narrow portions. In another embodiment, the first plate comprises a bridge portion connecting the stationary part and the movable part, and the narrow portion is formed on a bridge part of the main body portion of the second plate which overlaps the bridge portion. The disk drive suspension may further comprise a weld configured to secure the first plate and the second plate to each other. In this embodiment, both the weld and the weld seal portion may be laser spot welds.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a perspective view of a suspension according to a first embodiment;

FIG. 14 is a perspective view of a suspension according to a sixth embodiment.

DETAILED DESCRIPTION OF THE INVENTION

A disk drive suspension according to a first embodiment of the present invention will now be described with reference to FIGS. 1 to 7.

Figure 1:
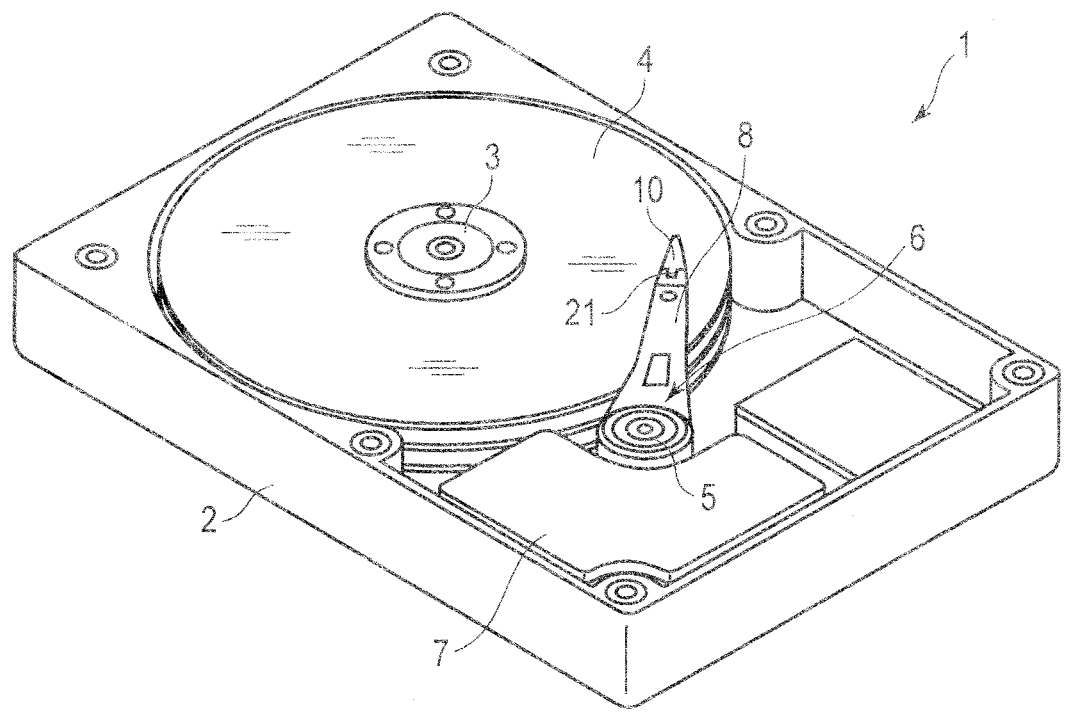
FIG. 1 is a perspective view showing an example of a disk drive.

A disk drive (HDD) 1 shown in FIG. 1 comprises a case 2, disks 4 rotatable about a spindle 3, carriage 6 turnable about a pivot 5, positioning motor (voice coil motor) 7 for actuating the carriage 6, etc. The case 2 is sealed by a lid (not shown).

Figure 2:
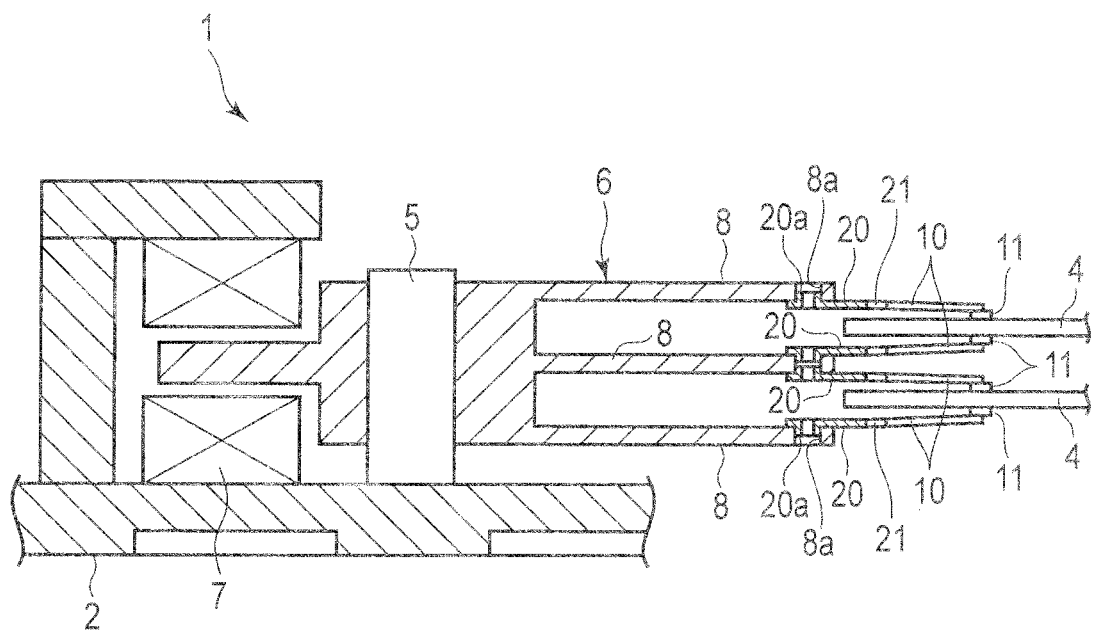
FIG. 2 is a sectional view of a part of the disk drive shown in FIG. 1.

FIG. 2 is a sectional view schematically showing a part of the disk drive 1. As shown in FIGS. 1 and 2, the carriage 6 comprises arms (carriage arms) 8. A suspension 10 is mounted on the distal end portion of each arm 8. A slider 11, which constitutes a magnetic head, is provided on the distal end portion of the suspension 10. If each disk 4 rotates at high speed, an air bearing is formed between the disk and the slider 11.

If the carriage 6 is turned by the positioning motor 7, the suspension 10 moves radially relative to the disk 4, whereupon the slider 11 moves to a desired track of the disk 4. Elements, such as magnetoresistive elements, capable of transduction between magnetic and electrical signals are arranged on an end portion of the slider 11. These elements are used for accessing data on the disks 4, that is, for writing or reading the data.

FIG. 3 shows the suspension 10 of the dual-stage actuator (DSA) type. This suspension 10 comprises a base section 20 secured to its corresponding arm 8 (FIGS. 1 and 2) of the carriage 6, actuator mounting section 21, load beam 22, flexure 23 with conductors, etc. A boss portion 20a to be inserted into a hole 8a (FIG. 2) in each arm 8 is formed on the base section 20.

In FIG. 3, arrows X and S indicate the longitudinal direction of the load beam 22, that is, the longitudinal direction (front-rear direction) of the suspension 10, and a sway direction, respectively. Hinge portions 25 capable of thicknesswise elastic deformation are formed on the proximal portion (rear end portion) of the load beam 22. The actuator mounting section 21 is provided between the base section 20 and load beam 22 and has the function of moving the load beam 22 in the sway direction (indicated by arrow S).

The flexure 23 is disposed along the load beam 22 and secured to the load beam 22 by fixing means, such as laser spot welds. A tongue 23a (FIG. 3) that functions as a gimbal portion is formed near the distal end of the load beam 22, that is, near that of the flexure 23. The slider 11, which serves as the magnetic head, is mounted on the tongue 23a. The load beam 22, flexure 23, slider 11, etc., constitute a head gimbal assembly. A rear portion 23b of the flexure 23 extends rearward from the base section 20.

Figure 4:
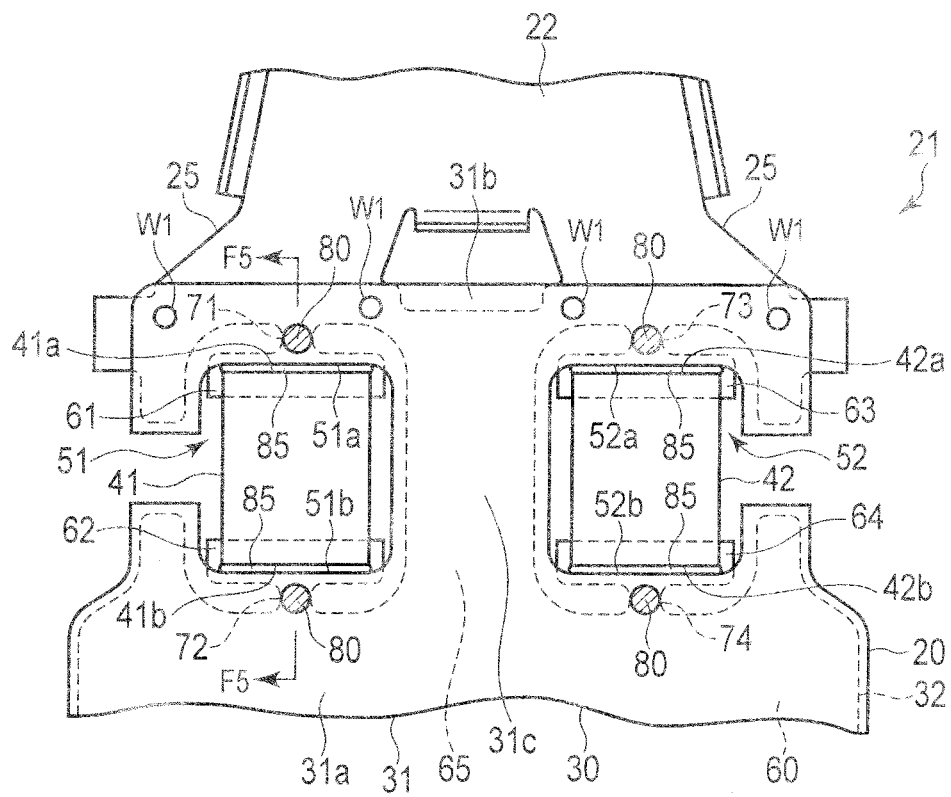
FIG. 4 is a plan view of an actuator mounting section of the suspension shown in FIG. 3.
Figure 5:
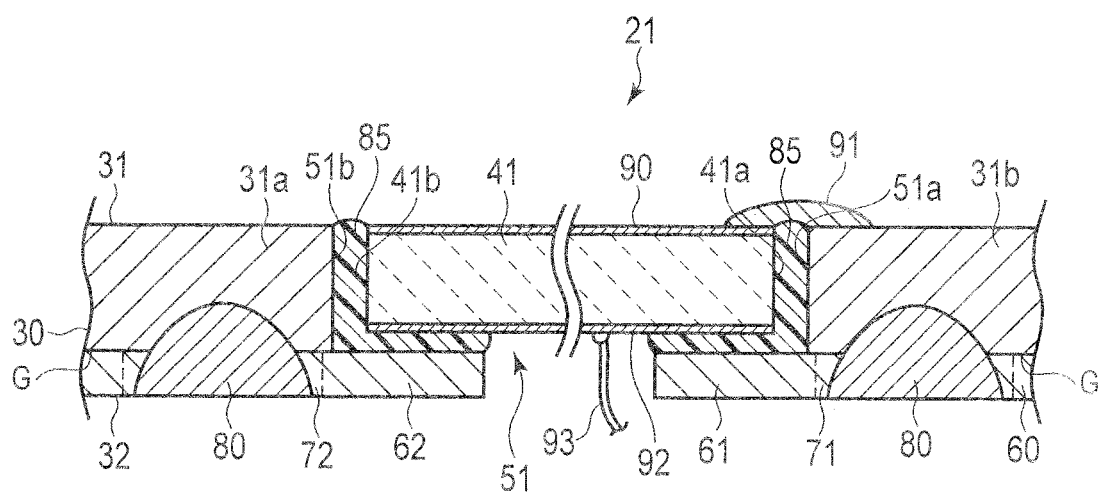
FIG. 5 is a sectional view of the actuator mounting section taken along line F5-F5 of FIG. 4.

FIG. 4 shows the actuator mounting section 21. FIG. 5 is a sectional view of the actuator mounting section 21 taken along line F5-F5 of FIG. 4. The actuator mounting section 21 comprises a plate member 30, which comprises first and second plates 31 and 32, and a pair of actuator elements 41 and 42 formed of piezoelectric plates of PZT or the like.

As shown in FIG. 5, the plate member 30 is formed by superposing the first and second plates 31 and 32 thicknesswise. The first plate 31 is thicker than the second plate 32. The first and second plates 31 and 32 are made of austenite stainless steel, such as SUS304. The chemical composition of SUS304 is 0.08 or less carbon, 1.00 or less silicon, 2.00 or less manganese, 8.00 to 10.50 nickel, 18.00 to 20.00 chromium, and iron for the remainder.

The first and second plates 31 and 32 are secured to each other by laser welds W1 (some of which are shown in FIGS. 3 and 4). The welds W1 are formed by converging laser light by means of a laser welding machine (not shown). A part (front part) of the plate member 30 comprising these two plates 31 and 32 constitutes the actuator mounting section 21. The remaining part (rear part) of the plate member 30 constitutes the base section 20.

Figure 6:
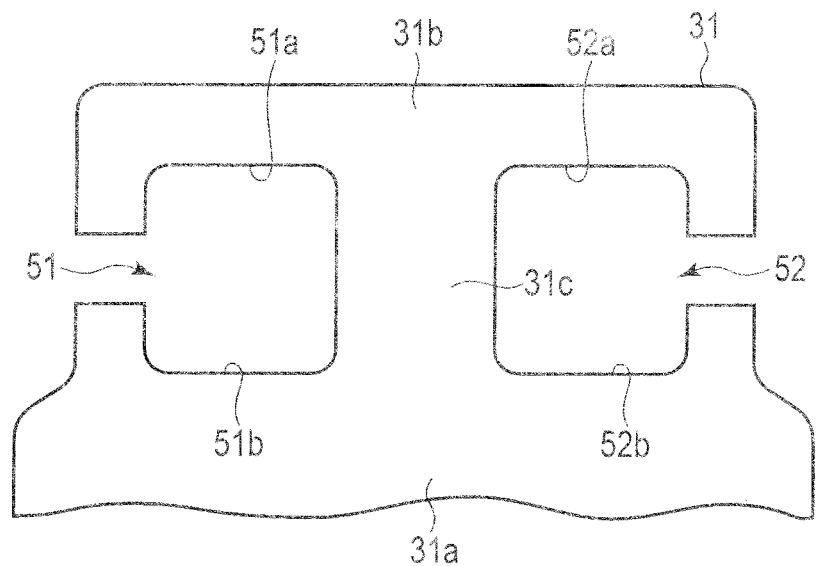
FIG. 6 is a partial plan view of a first plate of the actuator mounting section shown in FIG. 4.

FIG. 6 shows a part of the first plate 31. The first plate 31 is formed with openings 51 and 52 capable of accommodating actuator elements 41 and 42, respectively. Actuator elements 41 and 42 are accommodated in openings 51 and 52, respectively. The first plate 31 comprises a stationary part 31a, movable part 31b, and bridge portion 31c. The stationary part 31a adjoins the base section 20. The movable part 31b is secured to the hinge portions 25 of the load beam 22. The bridge portion 31c connects the stationary part 31a and movable part 31b. The stationary part 31a is a part that is substantially immovable relative to the base section 20. The movable part 31b is a part that can be moved in the sway direction by actuator elements 41 and 42. The bridge portion 31c that connects the stationary and movable parts 31a and 31b extends longitudinally relative to the suspension 10.

Figure 7:
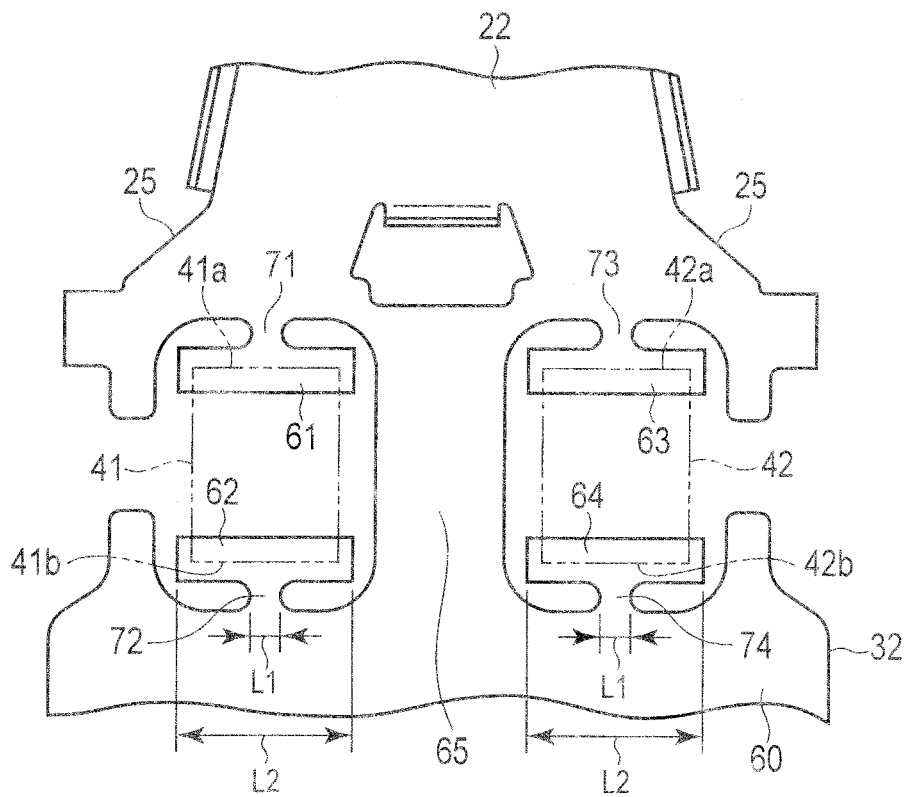
FIG. 7 is a partial plan view of a second plate of the actuator mounting section shown in FIG. 4.

FIG. 7 shows a part of the second plate 32. The second plate 32 comprises a main body portion 60, a pair of supporting portions 61 and 62, a pair of supporting portions 63 and 64, and bridge part 65. The main body portion 60 overlaps the first plate 31. Supporting portions 61 and 62 support opposite ends 41a and 41b, respectively, of the one actuator element 41. Supporting portions 63 and 64 support opposite ends 42a and 42b, respectively, of the other actuator element 42. The bridge part 65 is formed corresponding in position to the bridge portion 31c of the first plate 31.

As shown in FIGS. 4 and 7, the main body portion 60 of the second plate 32 is formed with narrow portions 71 to 74 narrower than the first plate 31. Specifically, narrow portions 71 and 72 are formed near supporting portions 61 and 62, respectively, which support the one actuator element 41. Further, narrow portions 73 and 74 are formed near supporting portions 63 and 64, respectively, which support the other actuator element 42. Width L1 (FIG. 7) of each of narrow portions 71 to 74 is less than width L2 of each of supporting portions 61 to 64. As shown in FIG. 7, each of narrow portions 71 to 74 is formed in a region near and narrower than width L2 of each corresponding one of supporting portions 61 to 64.

As shown in FIG. 4, a weld seal portion 80 is formed on each of narrow portions 71 to 74. In FIG. 4, the weld seal portions 80 are hatched for ease of illustration. The weld seal portions 80 are formed on either of the first and second plates 31 and 32 by melting the plates 31 and 32 by laser spot welding as an example of laser welding. These weld seal portions 80 serve to seal a mating surface G (schematically shown in FIG. 5) between the first and second plates 31 and 32 at narrow portions 71 to 74.

As shown in FIG. 4, actuator elements 41 and 42 are rectangular in a plan view. Adhesive 85 is provided between the one end 41a of the one actuator element 41 and an inner surface 51a of opening 51. The adhesive 85 is also provided between the other end 41b of actuator element 41 and an inner surface 51b of opening 51. The adhesive 85 is provided between the one end 42a of the other actuator element 42 and an inner surface 52a of opening 52. The adhesive 85 is also provided between the other end 42b of actuator element 42 and an inner surface 52b of opening 52. The adhesive 85 consists mainly of, for example, an electrically insulating, thermosetting high-polymer material. The adhesive 85 is applied in a liquid state to inner surfaces 51a, 51b, 52a and 52b of the openings 51, 52 and supporting portions 61 to 64. Thereafter, actuator elements 41 and 42 are disposed in openings 51 and 52, respectively. Then, the adhesive 85 is cured by heating. The adhesive 85 may alternatively be a photo-curing adhesive, which can be cured by, for example, ultraviolet irradiation.

As representatively shown in FIG. 5, a first electrode 90 is provided on one thicknesswise surface of actuator element 41. The first electrode 90 is electrically connected to the first plate 31 through a first conductive member 91, such as silver paste. A second electrode 92 is provided on the other surface of actuator element 41. The second electrode 92 is connected to a conductor portion (not shown) of the flexure 23 through a second conductive member 93, such as a bonding wire. The other actuator element 42 is constructed in the same manner as actuator element 41.

A manufacturing method for the suspension 10 comprises the following processes.

(1) The first plate 31 comprising openings 51 and 52 capable of accommodating actuator elements 41 and 42 is formed by pressing or etching a metal plate of stainless steel or the like.

(2) The second plate 32 comprising the main body portion 60, supporting portions 61 to 64, and narrow portions 71 to 74 is formed by pressing or etching a metal plate of stainless steel or the like.

(3) The first and second plates 31 and 32 are superposed on each other.

(4) The weld seal portions 80 are formed on narrow portions 71 to 74 by laser-welding the first and second plates 31 and 32 together at narrow portions 71 to 74.

(5) The uncured adhesive 85 is applied to inner surfaces 51a and 52a of openings 51 and 52 and supporting portions 61 to 64.

(6) Actuator elements 41 and 42 are disposed in openings 51 and 52, respectively.

(7) By the weld seal portions 80 at narrow portions 71 to 74, the uncured adhesive 85 is prevented from moving deep into the mating surface between the first and second plates 31 and 32.

(8) The adhesive 85 is cured.

The following is a description of the operation of the suspension 10.

If the carriage 6 (FIGS. 1 and 2) is turned by the positioning motor 7, the suspension 10 moves radially relative to the disk 4, whereupon the slider 11 of the magnetic head moves to a desired track of the recording surface of the disk 4. If a voltage is applied to actuator elements 41 and 42, the actuator elements are distorted in opposite directions according to the voltage level. Thereupon, the load beam 22 can be finely moved in the sway direction (indicated by arrow S in FIG. 3). As actuator elements 41 and 42 extend and contract, respectively, for example, the load beam 22 moves in the sway direction. Thus, the slider 11 can be positioned quickly and accurately in the sway direction.

At narrow portions 71 to 74, in the present embodiment described above, the mating surface G (FIG. 5) between the first and second plates 31 and 32 is sealed by the weld seal portions 80. The uncured (or liquid) adhesive 85 applied to supporting portions 61 to 64 infiltrates deeply into the mating surface G via narrow portions 71 to 74 by capillary action. Since the weld seal portions 80 are formed on the mating surface G at narrow portions 71 to 74, however, they can prevent the uncured adhesive 85 from moving deep into the mating surface G. Accordingly, the adhesive 85 can be kept from infiltrating between the first and second plates 31 and 32 and being cured. Thus, the rigidity of the actuator mounting section 21 can be prevented from being influenced by the adhesive 85.

The weld seal portion 80 can be formed by means of the laser welding machine used for the laser spot welds W1 that secure the first and second plates 31 and 32. Thus, the laser welding machine used for the laser spot welds W1 can be directly used without additionally using any special equipment for melting the weld seal portions 80. The weld seal portions 80 can also serve to secure the first and second plates 31 and 32 to each other.

Figure 8:
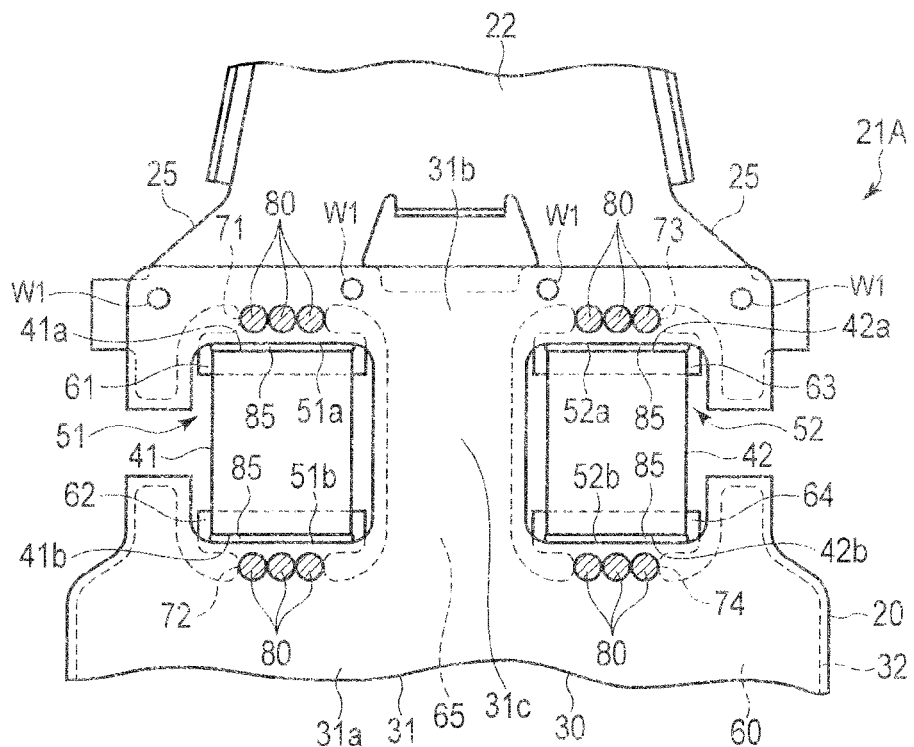
FIG. 8 is a plan view of an actuator mounting section of a suspension according to a second embodiment.
Figure 9:
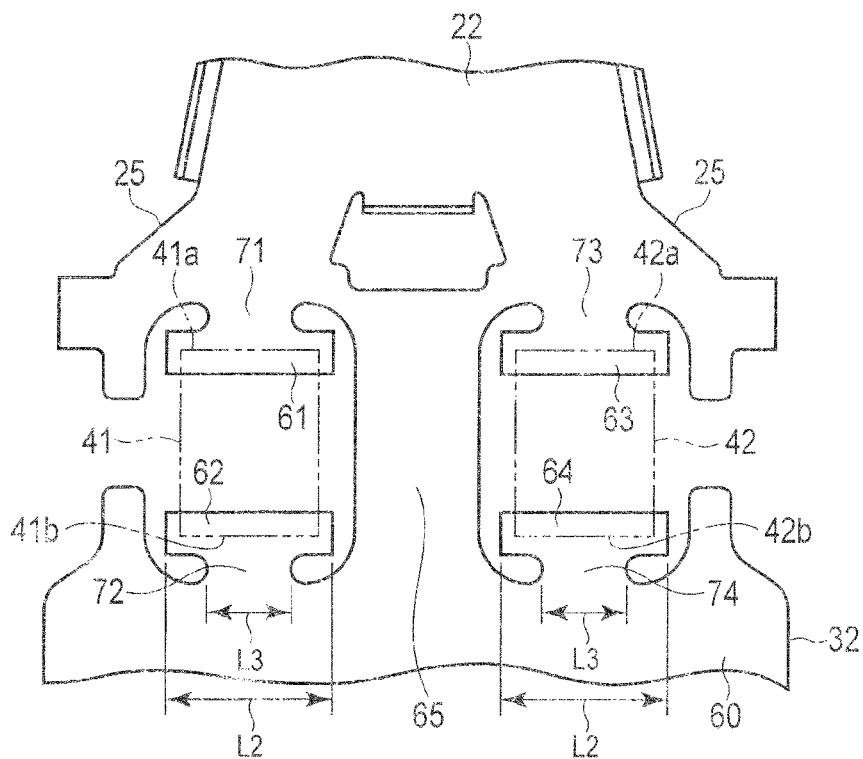
FIG. 9 is a partial plan view of a second plate of the actuator mounting section shown in FIG. 8.

FIGS. 8 and 9 show a second embodiment. Width L3 (FIG. 9) of each of narrow portions 71 to 74 of an actuator mounting section 21A of this embodiment is greater than width L1 (FIG. 7) of each of narrow portions 71 to 74 of the first embodiment. As shown in FIG. 8, each of narrow portions 71 to 74 is formed with a plurality of weld seal portions 80 by laser spot welding. Since other configurations and effects are common to actuator mounting sections 21 and 21A of the first and second embodiments, common numbers are used to designate common portions of the first and second embodiments, and a description of those portions is omitted.

Figure 10:
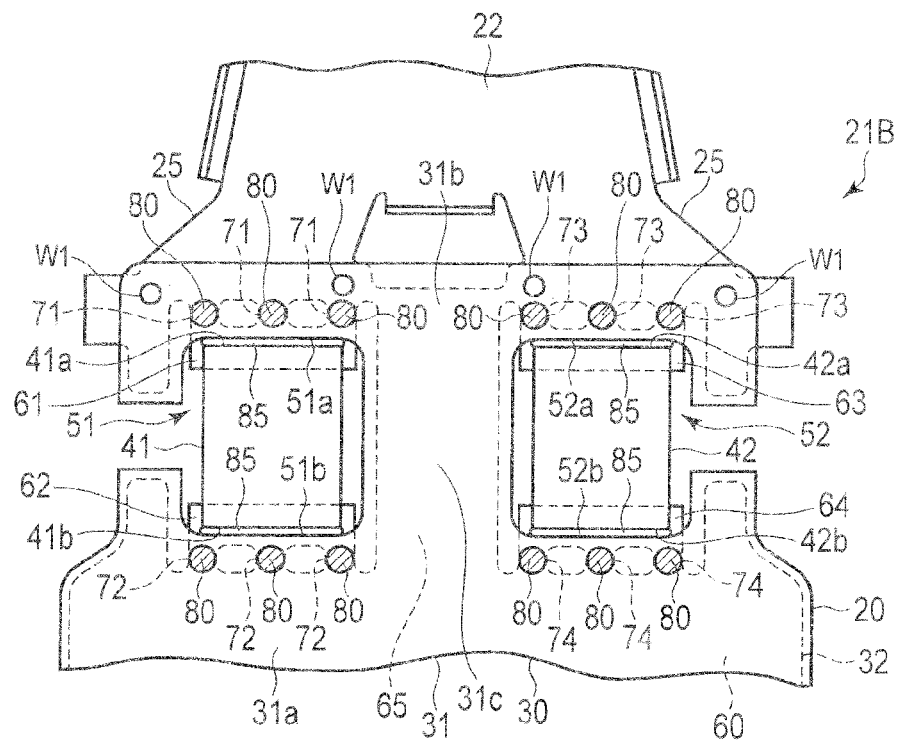
FIG. 10 is a plan view of an actuator mounting section of a suspension according to a third embodiment.
Figure 11:
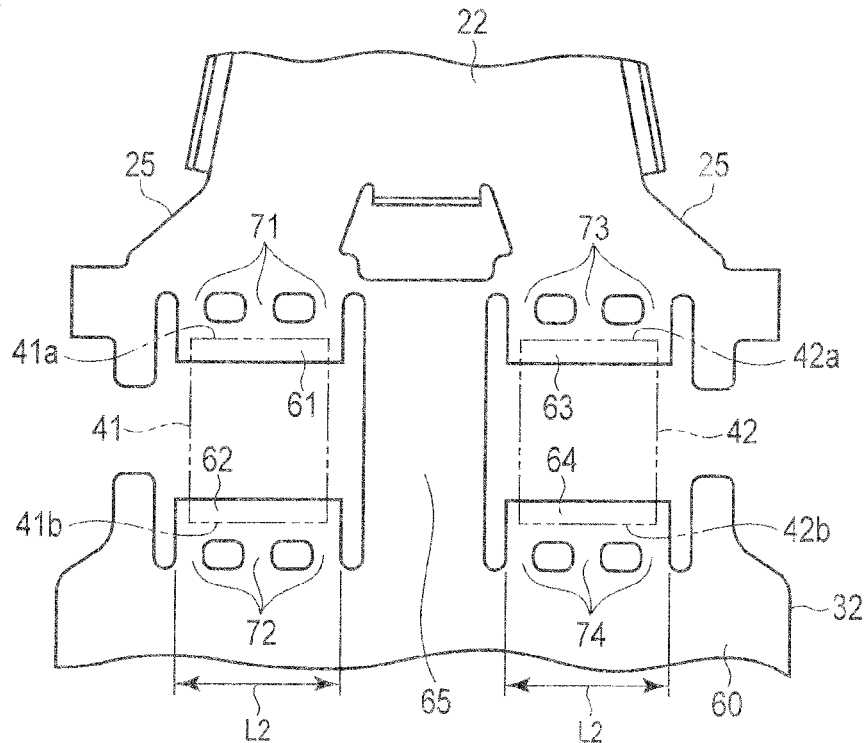
FIG. 11 is a partial plan view of a second plate of the actuator mounting section shown in FIG. 10.

FIGS. 10 and 11 show a third embodiment. A second plate 32 of an actuator mounting section 21B of this embodiment is formed such that a plurality of narrow portions 71 to 74 are arranged spaced apart from one another, transversely relative to supporting portions 61 to 64, for each of supporting portions 61 to 64. As shown in FIG. 11, each of narrow portions 71 to 74 is formed in a region narrower than width L2 of each corresponding one of supporting portions 61 to 64. A weld seal portion 80 is provided on each of narrow portions 71 to 74. Since other configurations and effects are common to actuator mounting sections 21 and 21B of the first and third embodiments, common numbers are used to designate common portions of the first and third embodiments, and a description of those portions is omitted.

Figure 12:
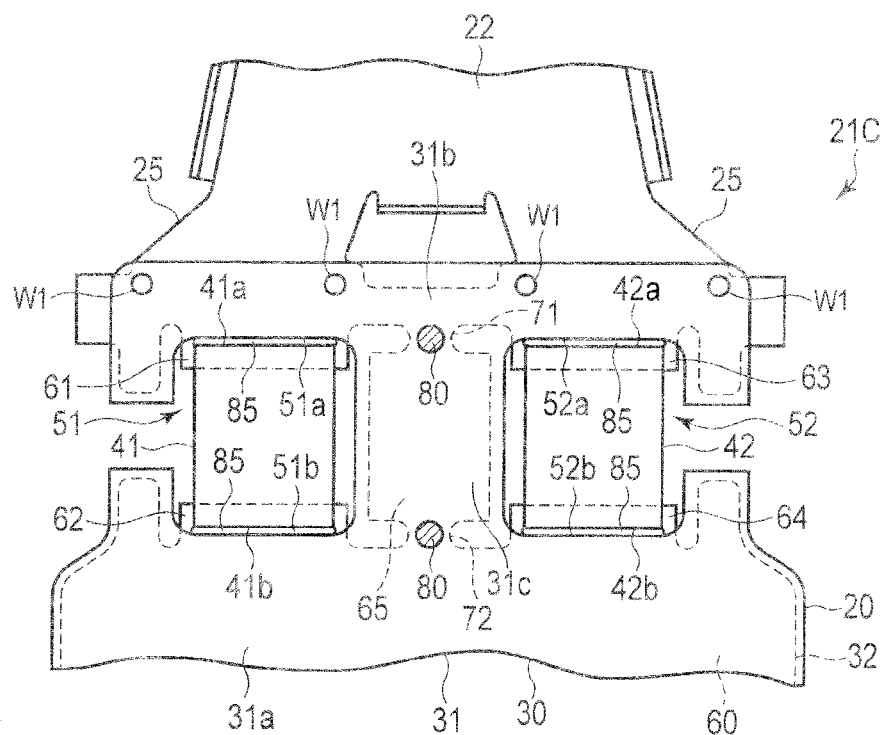
FIG. 12 is a plan view of an actuator mounting section of a suspension according to a fourth embodiment.

FIG. 12 shows an actuator mounting section 21C according to a fourth embodiment. In this embodiment, narrow portions 71 and 72 are provided individually at opposite ends of a bridge part 65 of a second plate 32. A weld seal portion 80 is formed on each of narrow portions 71 and 72. The weld seal portions 80 serve to keep uncured adhesive 85 applied to supporting portions 61 to 64 from infiltrating into a mating surface between a bridge portion 31c of a first plate 31 and the bridge part 65 of the second plate 32. Thus, the adhesive 85 can be prevented from solidifying between the bridge portion 31c and bridge part 65. Since other configurations and effects are common to actuator mounting sections 21 and 21C of the first and fourth embodiments, common numbers are used to designate common portions of the first and fourth embodiments, and a description of those portions is omitted.

Figure 13:
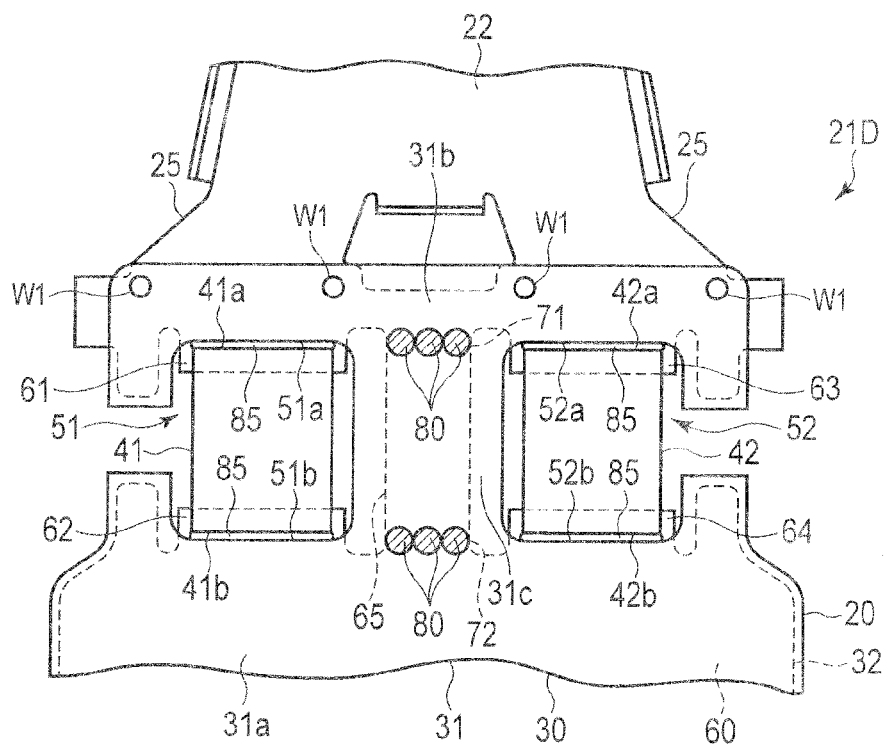
FIG. 13 is a plan view of an actuator mounting section of a suspension according to a fifth embodiment.

FIG. 13 shows an actuator mounting section 21D according to a fifth embodiment. In this embodiment, narrow portions 71 and 72 wider than those of the fourth embodiment (FIG. 12) are formed individually at opposite ends of a bridge part 65. A plurality of weld seal portions 80 are provided on each of narrow portions 71 and 72 by laser spot welding. Since other configurations and effects are common to actuator mounting sections 21C and 21D of the fourth and fifth embodiments, common numbers are used to designate common portions of the fourth and fifth embodiments, and a description of those portions is omitted.

Figure 15:
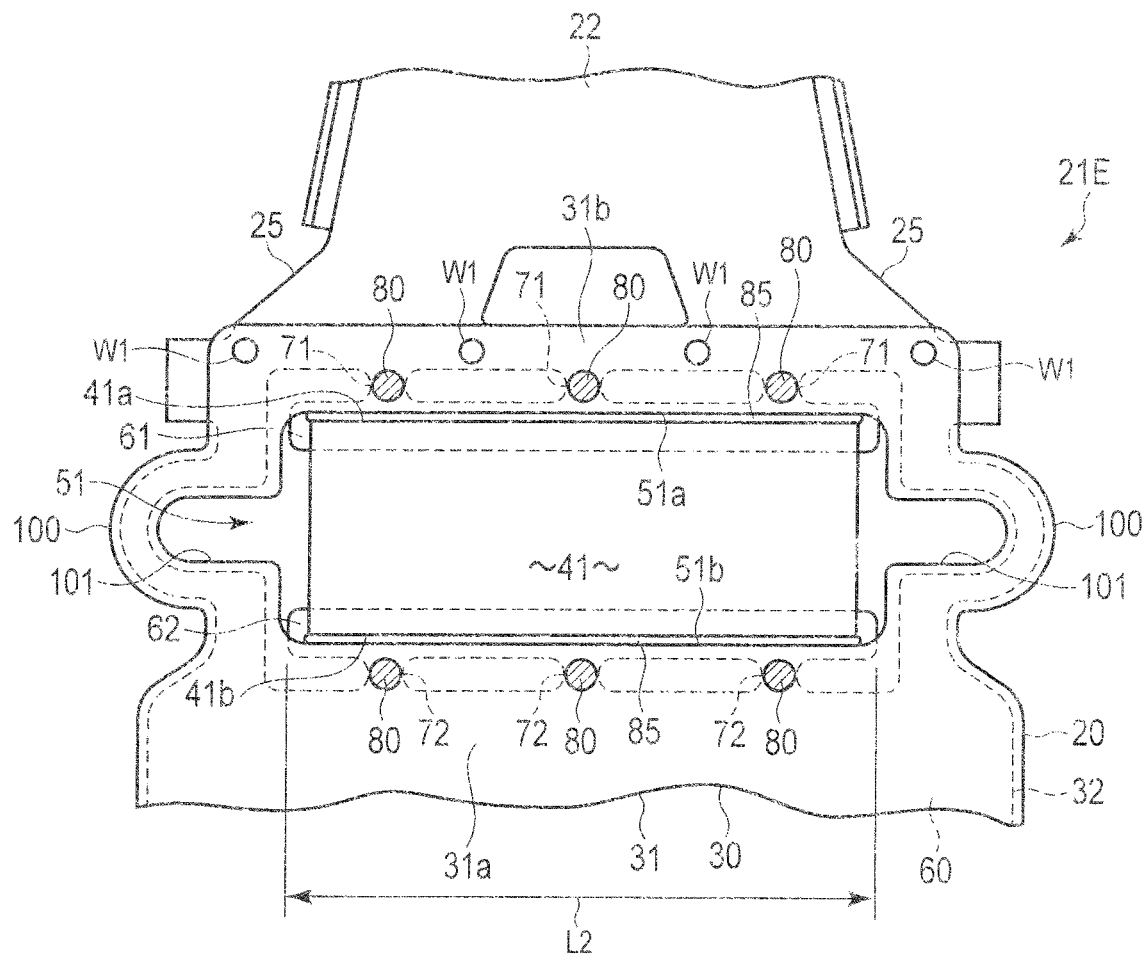
FIG. 15 is a plan view of an actuator mounting section of the suspension shown in FIG. 14.

FIGS. 14 and 15 show a sixth embodiment. An actuator mounting section 21E of this embodiment comprises a single actuator element 41. Further, U-shaped arm portions 100 are formed individually on opposite side portions of a plate member 30. A slit 101 is formed inside each arm portion 100. The plate member 30, like that of actuator mounting section 21 (FIG. 4) of the first embodiment, comprises first and second plates 31 and 32. The second plate 32 comprises a main body portion 60, which overlaps the first plate 31, and supporting portions 61 and 62, which support opposite ends 41a and 41b, respectively, of actuator element 41. The main body portion 60 is formed with a plurality of narrow portions 71 and 72 and weld seal portions 80 in regions near supporting portions 61 and 62 and narrower than width L2 of the supporting portions. Narrow portions 71 and 72 and weld seal portions 80 are arranged at intervals along the width of supporting portions 61 and 62.

If a voltage is applied to actuator element 41 so that the actuator element is distorted, in actuator mounting section 21E of this embodiment, one of the arm portions 100 contracts, and the other extends. Thereupon, a load beam 22 can be moved in a sway direction (indicated by arrow S in FIG. 14). Since other configurations and effects are common to actuator mounting sections 21 and 21E of the first and sixth embodiments, common numbers are used to designate common portions of the fourth and fifth embodiments, and a description of those portions is omitted.

It is to be understood, in carrying out the present invention, that the specific forms of the constituent elements of the suspension, including the first and second plates constituting the plate member, narrow portions, weld seal portions, adhesive, actuator elements, etc., as well as of the actuator mounting section, may be modified variously.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive suspension having a pair of actuator elements, the disk drive suspension comprising:
    a first plate comprising: (i) a pair of openings each of which accommodates a respective one of the pair of actuator elements, (ii) a stationary part to which a first end of each of the actuator elements is secured, (iii) a movable part to which a second end of each of the actuator elements is secured, and (iv) a bridge portion formed between the pair of openings and connecting the stationary part and the movable part;
    a second plate comprising: (i) a main body portion which overlaps with the first plate thicknesswise, (ii) supporting portions which support opposite ends of each of the actuator elements, (iii) a bridge part overlapping the bridge portion, and (iv) narrow portions formed at both ends of the bridge part and being narrower than the bridge portion;
    a weld seal portion which fixes the first plate and the second plate together and which seals a mating surface between the first plate and the second plate at the narrow portions; and
    adhesives respectively provided between the opposite ends of the actuator elements and inner surfaces of the openings.

2. The disk drive suspension according to claim 1, wherein a width of each of the narrow portions is smaller than a width of the bridge part.

3. The disk drive suspension according to claim 1, wherein the weld seal portion is provided in a plurality of places in a width direction of each of the narrow portions.

4. The disk drive suspension according to claim 1, further comprising a weld which fixes the first plate and the second plate to each other.

5. The disk drive suspension according to claim 4, wherein both the weld and the weld seal portion are laser spot welds.

* * * * *